Patented May 20, 1952

2,597,566

UNITED STATES PATENT OFFICE 2,597,566

METHOD OF PREPARING A SOLUBLE PROTEIN FROM KERATINACEOUS MATERIALS

Bernard Chiego, Newark, N. J., assignor of sixteen and two-thirds per cent to Frank Gardner, Baltimore, Md., and fifty per cent to Eliot D. Pratt, New York, N. Y.

No Drawing. Application November 19, 1949, Serial No. 128,496

12 Claims. (Cl. 260—123.7)

This invention relates to the conversion of keratinaceous material such as feathers, horn, hoofs, hair, etc., into a water soluble form, suitable as a source of protein for animal nutrition.

More particularly the invention deals with what may seem to be a relatively simple and direct method of converting feathers from chickens, geese, turkeys, and other fowl into water soluble proteins useful as a source of protein for animal nutrition.

Furthermore, this invention relates to a method for effecting the solubilization of that fraction of the keratin which is free from color principles, the final product having a golden brown color and being completely soluble in cold water.

It may be said that the prior art discloses the use of reducing agents such as monoethylene thioglycol, and ammonium thioglycollate as reducing agents under controlled conditions for effecting the solution of keratins at relatively low temperatures and without pressure. The prior art also discloses the use of bisulfites and wetting agents in the art of permanent hair waving but this does not effect any solution of the keratin.

The method hereinafter set forth to accomplish the result sought, involves the use of inexpensive chemicals at low concentrations but at high temperatures and pressures to effect the solubilization of the keratin with a minimum of decomposition. In addition, this method is selective in permitting solution of the major portion of the keratin as a golden brown material while leaving behind the color principles, melanin etc., as an insoluble residue representing some 15% of the initial weight of the feathers. This insoluble black residue contains 7.0 to 8.0% nitrogen and can be useful as an organic source of this element or as an addition to fertilizers.

The soluble portion of the keratin obtained by my process shows by analysis as much as 97.8% protein on the nitrogen basis ($N \times 6.25$). In order to effect said solubilization of keratinaceous matter the material may be treated with a dilute solution of alkalis and/or alkaline earth compounds with or without the addition, but preferably with the addition, of a small amount of reducing agent such as sodium bisulfite.

I have found after many tests that when keratinaceous products are submitted to digestion in such a liquid medium at pressures of from 75 to 100 pounds and for a time interval of from 1 to 3 hours preferably with stirring, the major portion of said keratinaceous matter will go into solution. However, when NaOH in 0.25% concentration is employed there are considerable losses of ammonia and hydrogen sulfide, indicating the undesirable breakdown of the proteins and destruction of the sulfur bearing amino acid moieties in said proteins, notably cystine, cysteine, and methionine. In addition, it will be found that the product of said digestion, using NaOH as stated, will be difficult to filter, hard to dry, and is dark colored. I have found that these losses may be considerably reduced by lowering the concentration of alkali to 1% and lower in the digesting liquor but the color of the final liquor, i. e., solution of keratins, is rather dark.

All of these undesirable features may be avoided by using dilute solutions of the oxides, and/or hydroxides of the alkaline earth metals of group II on the atomic chart. Thus, upon digesting 50 parts of keratinaceous matter such as fowl feathers with 1.5 parts of $Ca(OH)_2$ in 400 parts of water for 3 hours at 100 pounds of steam gauge pressure without stirring there is obtained an insoluble residue of 14.0% and a solution containing soluble proteins representing more than 75.0% of the original weight of feathers and analyzing 96.5% protein ($N \times 6.25$). This liquid may be concentrated and dried in any suitable manner to yield a light golden brown flake or powder. Only traces of $NH_3$ and $H_2S$ are lost indicating a minimum of destruction of the proteins involved.

A further improvement is obtained by digesting 10 parts of feathers in 80 to 100 parts of water containing 0.1 part of $NaHSO_3$ and 0.3 part of CaO (based on the dry feather weight). The digestion may be conducted at 75 to 80 pounds steam gauge pressure for a time interval of 3 hours without stirring or for 1 hour with stirring. No $NH_3$ or $H_2S$ is evolved and the soluble protein is found to be 84.0% of the original feather weight and the insoluble residue is about 13%. The soluble portion is of light golden color, is easily filtered and readily dried to yield golden yellow flakes analyzing more than 97.0% protein ($N \times 6.25$).

MgO may be substituted for CaO and the respective hydroxides may be used either alone or in combination. In like manner Ba and Sr can be employed but I prefer not to use these because of their high toxicity and the necessity for their complete removal as sulfate or carbonate prior to obtaining a protein material satisfactory as a food adjunct.

The yields obtained are considerably affected by the concentration, time and temperature of digestion. Below I cite a series of a number of experiments which will adequately indicate to those skilled in the art, the benefits to be obtained by using this method of solubilization of keratins at the respective levels of concentrations of the chemicals employed.

*Experiments*

1

10 parts feathers
3 parts MgO
150 parts water

Pressure cook for 3 hours at 100 lbs.

|  | Per cent |
|---|---|
| Residue | 15.0 |
| Protein (sol. ext.) | 69.0 |
| Protein (N×6.25) | 79.5 |

($NH_3$ and $H_2S$ evolved during digestion.)

2

10 parts feathers
1 part $Mg(OH)_2$
150 parts water

Pressure cook for 3 hours at 100 lbs.

|  | Per cent |
|---|---|
| Residue | 11.0 |
| Protein sol. ext. | 78.0 |
| Protein (N×6.25) | 87.5 |

($NH_3$ and $H_2S$ evolved in slight amount.)

3

10 parts feathers
0.2 part MgO
0.2 part $Ca(OH)_2$
150 parts water

Pressure cook for 3 hours at 100 lbs.

|  | Per cent |
|---|---|
| Residue | 12.0 |
| Protein sol. ext. | 81.0 |
| Protein (N×6.25) | 97.9 |

($NH_3$ and $H_2S$ evolved in very slight amount.)

4

10 parts feathers
0.25 part NaOH
100 parts water

Pressure cook for 3 hours at 100 lbs.

|  | Per cent |
|---|---|
| Residue | 12.0 |
| Protein (sol. ext.) | 63.0 |
| Protein (N×6.25) | 89.2 |

($NH_3$ and $H_2S$ evolved during cook. $H_2S$ also evolved during evaporation of filtrate. Protein material obtained was of dark color and did not dry in scale form. Solution was difficult to filter. Also note lower protein yield.)

5

10 parts feathers
0.5 part $Ca(OH)_2$
150 parts water

Pressure cook for 3 hours at 100 lbs.

|  | Per cent |
|---|---|
| Residue | 13.0 |
| Protein sol. ext. | 64.0 |
| Protein (N×6.25) | 87.3 |

($NH_3$ and $H_2S$ evolved during cook. $H_2S$ test on vapors of evaporating liquor was positive.)

6

25 parts feathers
1 part $Ca(OH)_2$
200 parts water

Pressure cook for 3 hours at 100 lbs.

|  | Per cent |
|---|---|
| Residue | 12.4 |
| Protein sol. ext. | 75.2 |
| Protein (N×6.25) | 92.8 |

(Feather–water ratio reduced to 1 to 8. Very slight $H_2S$ and $NH_3$ evolution both in cook and on evaporating liquor.)

7

50 parts feathers
1.5 parts $Ca(OH)_2$
400 parts water

Pressure cook for 3 hours at 100 lbs.

|  | Per cent |
|---|---|
| Residue | 14.0 |
| Protein sol. ext. | 75.6 |
| Protein (N×6.25) | 96.5 |

(Very slight amounts $NH_3$ and $H_2S$ evolved.)

8

50 parts feathers
1 part $Ca(OH)_2$
1 part $Mg(OH)_2$
400 parts water

Pressure cook for 3 hours at 100 lbs.

|  | Per cent |
|---|---|
| Residue | 14.0 |
| Protein sol. ext. | 78.6 |
| Protein (N×6.25) | 96.8 |

(Slight amounts $NH_3$ and $H_2S$ evolved.)

9

10 parts feathers
0.2 part MgO
0.2 part CaO
100 parts water

Pressure cook for 3 hours at 50 lbs.

|  | Per cent |
|---|---|
| Residue | 37.3 |
| Protein sol. ext. | 54.0 |
| Protein (N×6.25) | 88.2 |

(Slight amounts $NH_3$ and $H_2S$ evolved. It will be noted that at 50 pounds pressure, digestion is not complete as evidenced by high residue and low protein yield.)

10

10 parts feathers
.1 part $NaHSO_3$
.3 part $Ca(OH)_2$
100 parts water

Pressure cook for 3 hours at 75 lbs.

|  | Per cent |
|---|---|
| Residue | 14.1 |
| Protein sol. ext. | 74.0 |
| Protein (N×6.25) | 96.4 |

(Very slight $NH_3$ and $H_2S$ loss. No $H_2S$ evolved on boiling liquor. Note that in this experiment the addition of a small amount of $NaHSO_3$ resulted in preventing the breakdown of cystine, cysteine and methionine as evidenced by the absence of $H_2S$ in the vapors of the boiling liquor.)

11

10 parts feathers
.1 part NaHSO₃
.3 part CaO
100 parts water

Pressure cook for 3 hours at 80 lbs. stir after cooking for 2 hours.

Residue _____ 13.0%
Protein sol. ext._____ 84.0%
Protein (N×6.25) _____ 96.8% of the sol. ext. solids (No H₂S or NH₃ evolved. Evaporating liquor did not show that H₂S was evolved. Protein material was completely soluble in water. Highest yield was obtained by this method.)

It will be noted from the foregoing that solubilization is readily effected by a number of chemicals at varying concentrations. However, the results obtained in Expt. #11 are the best from a commercial standpoint.

I have previously stated that the solubilizing effects may be obtained by using the oxides, hydroxides, or carbonates of group I. In addition from group II, Ba and Sr may be similarly employed but I prefer not to use them because of the necessity for a further step, especially when Ba is used, in the purification of the protection for commercial use.

The time of digestion may be shortened by using an autoclave equipped with a stirrer and the time-temperature variable may be altered within considerable limits without departing from the scope of this disclosure.

Thus a very simple plant may be erected for the preparation of protein suitable for feed purposes from keratinaceous matter by the preferred method set forth in Expt. #11 in which CaO may also be Ca(OH)₂, MgO or Mg(OH)₂ or a combination of these may also be used. Hereinbefore I have also referred to the use of Ba and Sr and the members of group I as solubilizers. Hence what I seek to cover in this disclosure is the solubilization of keratinaceous materials in relatively dilute solutions of the alkalis or the alkaline earth oxides or hydroxides with or without the addition of a small amount of a reducing salt such as NaHSO₃ at elevated temperatures and pressures for varying time limits to effect the solubilization of the major portion of said keratinaceous material. While the examples cited refer to feathers only, I have found that comminuted horn, hoof, hair and any fowl feathers may be similarly solubilized in large part. The preferred method as exemplified in Expt. #11 is chosen because of high yields, the nature of the solubilized protein, the low cost of chemicals and the simplicity of the plant equipment requirements for treating large tonnages of said keratinaceous matter.

I have conducted further tests to determine the suitability of the use of the carbonates and bicarbonates of sodium and potassium in the preparation of protein from feathers, horn and hoofs. The following are listed as some of the examples of these numerous tests:

12

100 parts feathers
3 parts Na₂CO₃
1 part NaHSO₃
100 parts H₂O

Digested at 75–80 lbs. for 1½ hours.

|  | Per cent |
|---|---|
| Residue | 33.0 |
| Protein | 61.1 |
| Protein (N×6.25) | 86.6 |

13

100 parts feathers
5 parts NaHCO₃
1 part NaHSO₃
1000 parts H₂O

Digested at 75–80 lbs. for 1½ hours.

|  | Per cent |
|---|---|
| Residue | 29.1 |
| Protein | 68.2 |
| Protein (N×6.25) | 89.4 |

14

100 parts feathers
3 parts K₂CO₃
1 part NaHSO₃
1000 cc. H₂O

Digested at 85–90 lbs. for 1½ hours.

|  | Per cent |
|---|---|
| Residue | 27.2 |
| Protein | 71.4 |
| Protein (N×6.25) | 92.6 |

15

100 parts feathers
5 parts KHCO₃
1 part NaHSO₃
1000 parts H₂O

Digested at 85–90 lbs. for 1½ hours.

|  | Per cent |
|---|---|
| Residue | 25.9 |
| Protein | 72.3 |
| Protein (N×6.25) | 90.7 |

In the above experiments (Examples 12 to 15) great difficulty was experienced in the filtration of the digested liquor. The resulting filtrate was of much darker color than that obtained in digestions with the oxides and hydroxides of the group 2 metals. The residue was greater due to the difficulty of washing said residue to remove the soluble portions and the protein yield was correspondingly lower. Greater decomposition of the protein was noted by the amount of H₂S and NH₄OH evolved in comparison with the digestion performed with the oxides and/or hydroxides of group 2 metals.

I therefore prefer, over all other methods, the use of the oxides and/or the hydroxides of calcium and magnesium with or without the addition of a reducing agent, such as sodium bisulfite, in the digestion of feathers to obtain a satisfactory protein material, as these agents give a digestion liquor which is:

1. Easier to filter.
2. Gives less decomposition of the protein.
3. The drying of the protein is greatly simplified.
4. The yields obtained are higher.
5. The quality, color and appearance of the finished product is better.

It will be observed that all of these tests have been made with materials based on groups 1 and 2 of the "Natural System of the Elements."

From the data given it will be readily understood that the method of procedure to obtain protein from keratinaceous materials may be varied over a considerable range without departing from the spirit of my invention and the scope of the appended claims.

I claim:
1. The method of preparing from keratinaceous materials, a soluble protein that is highly edible as an animal and poultry food and that is free from objectional colors, which consists in subjecting said materials to the action of oxides and hydroxides from the group consisting of calcium and magnesium and mixtures thereof in a relatively dilute solution of water at a steam gauge pressure ranging from approximately 50 to 100 lbs. and for approximately 1 to 3 hours and then blowing off the pressure, and separating the residue from the solution containing the protein.

2. The method of preparing keratin solution from feathers which consists in subjecting said feathers to the action of a low concentration of magnesium oxide in enough water to cover the feathers, under a steam gauge pressure of from 50 to 100 lbs. for from 1 to 3 hours.

3. The method of preparing keratin solution from feathers which consists in subjecting said feathers to the action of a low concentration of calcium oxide in enough water to cover the feathers, under a steam gauge pressure of from 50 to 100 lbs. for from 1 to 3 hours.

4. The method of preparing keratin solution from feathers which consists in subjecting said feathers to the action of a low concentration of magnesium hydroxide in enough water to cover the feathers, under a steam gauge pressure of from 50 to 100 lbs. for from 1 to 3 hours.

5. The method of preparing keratin solution from feathers which consists in subjecting said feathers to the action of a low concentration of calcium hydroxide in enough water to cover the feathers, under a steam gauge pressure of from 50 to 100 lbs. for from 1 to 3 hours.

6. The method of preparing from keratinaceous materials, a soluble protein that is highly edible as an animal and poultry food and that is free from objectional colors, which consists in subjecting said materials to the action of oxides and hydroxides from the group consisting of calcium and magnesium and mixture thereof, together with a small amount of bisulfite selected from the group consisting of sodium and potassium, in water at a steam gauge pressure ranging from approximately 50 to 100 lbs. and for approximately 1 to 3 hours, then reducing the pressure and separating the residue from the solution containing the keratinaceous material, then filtering the solution and drying the filtered material.

7. The method of preparing a soluble protein that is highly edible as an animal and poultry food from keratinaceous materials which consists in subjecting the materials to be treated in a relatively dilute solution of water and chemical agents comprising .1 part $NaHSO_3$ .3 part $CaO$ with 100 parts water and 10 parts feathers, at a steam gauge pressure ranging from approximately 50 to 100 lbs. and for approximately 1 to 3 hours, then reducing the pressure and separating the residue from the solution containing the keratinaceous material, then filtering the solution and drying the filtered material.

8. The method of preparing from keratinaceous materials, a soluble protein that is highly edible as an animal and poultry food and that is free from objectional colors, which consists in subjecting said materials to the action of the oxide of calcium together with a small amount of bisulfite of sodium in water at a steam gauge pressure ranging from approximately 50 to 100 lbs. and for approximately 1 to 3 hours, then reducing the pressure and separating the residue from the solution containing the keratinaceous material, then filtering the solution and drying the filtered material.

9. The method of preparing from keratinaceous materials, a soluble protein that is highly edible as an animal and poultry food and that is free from objectional colors, which consists in subjecting said materials to the action of the oxide of magnesium together with a small amount of bisulfite of sodium in water at a steam gauge pressure ranging from approximately 50 to 100 lbs. and for approximately 1 to 3 hours, then reducing the pressure and separating the residue from the solution containing the keratinaceous material, then filtering the solution and drying the filtered material.

10. The method of preparing from keratinaceous materials, a soluble protein that is highly edible as an animal and poultry food and that is free from objectional colors, which consists in subjecting said materials to the action of calcium hydroxide together with a small amount of bisulfite of sodium in water at a steam gauge pressure ranging from approximately 50 to 100 lbs. and for approximately 1 to 3 hours, then reducing the pressure and separating the residue from the solution containing the keratinaceous material, then filtering the solution and drying the filtered material.

11. The method of preparing from keratinaceous materials, a soluble protein that is highly edible as an animal and poultry food and that is free from objectional colors, which consists in subjecting said materials to the action of magnesium hydroxide together with a small amount of bisulfite of potassium in water at a steam gauge pressure ranging from approximately 50 to 100 lbs. and for approximately 1 to 3 hours, then reducing the pressure and separating the residue from the solution containing the keratinaceous material, then filtering the solution and drying the filtered material.

12. The method of preparing a soluble protein free of objectionable colors and that is highly edible as an animal and poultry food from feathers, which consists in subjecting the feathers to a solution of water and approximately 1% sodium bisulfite and 3% calcium oxide based on the weight of the feathers at from 50 to 100 lbs. from 1 to 3 hours in an autoclave.

BERNARD CHIEGO.

REFERENCES CITED

The following references are of record in the file of this patent:

UNITED STATES PATENTS

| Number | Name | Date |
|---|---|---|
| 2,164,798 | Campbell | July 4, 1939 |
| 2,212,470 | Friedrich | Aug. 20, 1940 |
| 2,324,951 | Ratzer | July 20, 1943 |
| 2,465,592 | Karlson et al. | Mar. 29, 1945 |
| 2,383,252 | Huntzicker | Aug. 21, 1945 |